United States Patent
Kakinohana et al.

(10) Patent No.: US 8,236,094 B2
(45) Date of Patent: Aug. 7, 2012

(54) EXHAUST GAS PURIFYING DEVICE

(75) Inventors: Masaru Kakinohana, Susono (JP);
Hirohito Hirata, Suntou-gun (JP);
Akira Mizuno, Nagoya (JP)

(73) Assignee: Toyota Jidosha Kabushiki Kaisha,
Aichi-ken (JP)

( * ) Notice: Subject to any disclaimer, the term of this patent is extended or adjusted under 35 U.S.C. 154(b) by 444 days.

(21) Appl. No.: 12/593,529

(22) PCT Filed: Mar. 27, 2008

(86) PCT No.: PCT/JP2008/056619
§ 371 (c)(1),
(2), (4) Date: Sep. 28, 2009

(87) PCT Pub. No.: WO2008/123557
PCT Pub. Date: Oct. 16, 2008

(65) Prior Publication Data
US 2010/0101420 A1    Apr. 29, 2010

(30) Foreign Application Priority Data

Mar. 29, 2007 (JP) ............................. 2007-088632

(51) Int. Cl.
*B03C 3/49* (2006.01)
(52) U.S. Cl. ............... 96/69; 55/DIG. 38; 96/77; 96/97; 96/98
(58) Field of Classification Search ............... 96/64, 65, 96/69, 77, 97–100; 55/DIG. 38; 95/78, 79
See application file for complete search history.

(56) References Cited

U.S. PATENT DOCUMENTS

| | | | | |
|---|---|---|---|---|
| 2,617,761 A * | 11/1952 | Sheer et al. | ................... | 75/10.23 |
| 3,157,479 A * | 11/1964 | Boles | ................. | 96/82 |
| 3,421,050 A * | 1/1969 | Topper et al. | ................... | 406/86 |
| 3,765,154 A * | 10/1973 | Hardt et al. | ....................... | 96/88 |
| 3,979,189 A * | 9/1976 | Alskog | ............... | 96/58 |
| 4,077,785 A * | 3/1978 | Hartshorn | ........................ | 96/99 |
| 4,244,710 A * | 1/1981 | Burger | ............... | 95/69 |
| 4,734,105 A * | 3/1988 | Eliasson et al. | ................... | 95/62 |
| 5,084,078 A * | 1/1992 | Suzuki et al. | ..................... | 96/52 |
| 5,622,543 A * | 4/1997 | Yang | ............... | 96/58 |
| 5,922,111 A * | 7/1999 | Omi et al. | ....................... | 96/60 |
| 6,071,330 A * | 6/2000 | Matsubara et al. | ................ | 96/69 |

(Continued)

FOREIGN PATENT DOCUMENTS

JP        52-13175 A *   2/1977   ...................... 96/97

(Continued)

OTHER PUBLICATIONS

International Search Report of PCT/JP2008/056619 dated Jul. 8, 2008.

*Primary Examiner* — Richard L Chiesa
(74) *Attorney, Agent, or Firm* — Sughrue Mion, PLLC

(57) ABSTRACT

The present invention provides an exhaust gas purifying device including an electrically insulated hollow cylindrical case, a cylindrical outer circumferential electrode arranged on an inner wall of the hollow cylindrical case, a bar-shaped center electrode held on a center axis of the outer circumferential electrode, and a metallic hollow cylindrical body arranged between the outer circumferential electrode and the center electrode, wherein the metallic hollow cylindrical body is electrically insulated and has a plurality of holes to permit particulate matter to pass therethrough without being accumulated.

8 Claims, 4 Drawing Sheets

U.S. PATENT DOCUMENTS

| | | | |
|---|---|---|---|
| 6,508,861 B1 * | 1/2003 | Ray | 95/79 |
| 6,632,267 B1 * | 10/2003 | Ilmasti | 95/59 |
| 2006/0278082 A1 * | 12/2006 | Tomimatsu et al. | 96/66 |

FOREIGN PATENT DOCUMENTS

| | | |
|---|---|---|
| JP | 07-197806 A | 8/1995 |
| JP | 2001-162134 A | 6/2001 |
| JP | 2005-120987 A | 5/2005 |
| JP | 2006-198546 A | 8/2006 |
| JP | 2006-320818 A | 11/2006 |
| WO | 03/067046 A1 | 8/2003 |

\* cited by examiner

EXHAUST GAS PURIFYING DEVICE

TECHNICAL FIELD

The present invention relates to an exhaust gas purifying device capable of burning and removing particulate matter (hereinafter referred to as PM) in an exhaust gas from internal combustion engines, etc., with a direct current source.

BACKGROUND ART

Various harmful components are included in an exhaust gas discharged from an internal combustion engine used for automobiles, etc., or an incineration system. Among the harmful components, it is particularly desirable to reduce $NO_x$, $SO_x$ and PM emissions. Regarding diesel engines, it has become desirable to reduce PM, and a particulate filter has been used to remove PM.

Such a particulate filter has a porous honeycomb structure made of ceramics such as cordierite, etc. Inlet openings of passages compartmentalized in a grid form are alternately plugged, while the remaining passages whose inlet openings are not plugged are plugged at their outlet openings. Consequently, the exhaust gas passing through porous walls which define the passages can be discharged toward the downstream side. PM is captured on the inner surfaces of the porous walls because PM in the exhaust gas cannot pass through the porous walls.

Such a filter is clogged with captured PM, causing an increase of flow resistance followed by a burden on an engine. Therefore, it is necessary to regenerate the filter by appropriately burning and removing PM prior to the increase of flow resistance caused by clogging. Under the operating conditions of a normal diesel engine, however, the exhaust gas does not reach a temperature sufficient for the self-burning of PM.

Subsequently, an exhaust gas purifying device (plasma reactor) has been recently proposed in which plasma is generated by a discharge, PM is burnt and removed by the oxidation action of the plasma, and $NO_x$ or the like is cleaned by the oxidation action of the plasma and the reduction action of a catalyst.

For example, Japanese Unexamined Patent Publication (Kokai) No. 2001-162134 proposes an exhaust gas purifying system which comprises a circular cylindrical outer circumference electrode, a discharge metal wire electrode at the center part of the outer circumference electrode, and an electrically insulated hollow cylindrical body inside the outer circumference electrode. In the system, the outer circumference electrode is grounded, the metal wire electrode is connected to a power supply source, a discharge is generated between the outer circumference electrode and the metal wire electrode by the action of the power supply source to generate plasma, and an electrically insulated hollow cylindrical body is arranged between the outer circumference electrode and the metal wire electrode to avoid useless energy consumption of sparks.

However, in the above-mentioned exhaust gas purifying device, a large amount of energy is required to generate plasma, and therefore, there is room for improvement in energy efficiency. An object of the present invention is to provide an exhaust gas purifying device having an improved PM capture rate, etc., as well as energy efficiency to solve the problems.

DISCLOSURE OF THE INVENTION

To solve the above problems, the present invention provides an exhaust gas purifying device comprising an electrically insulated hollow cylindrical case, a cylindrical outer circumferential electrode arranged on an inner wall of the hollow cylindrical case, a bar-shaped center electrode held on a center axis of the outer circumferential electrode, and a metallic hollow cylindrical body arranged between the outer circumferential electrode and the center electrode, wherein the metallic hollow cylindrical body is electrically insulated and has a plurality of holes to permit particulate matter to pass therethrough without being accumulated.

BEST MODE FOR CARRYING OUT THE INVENTION

Figure 1:
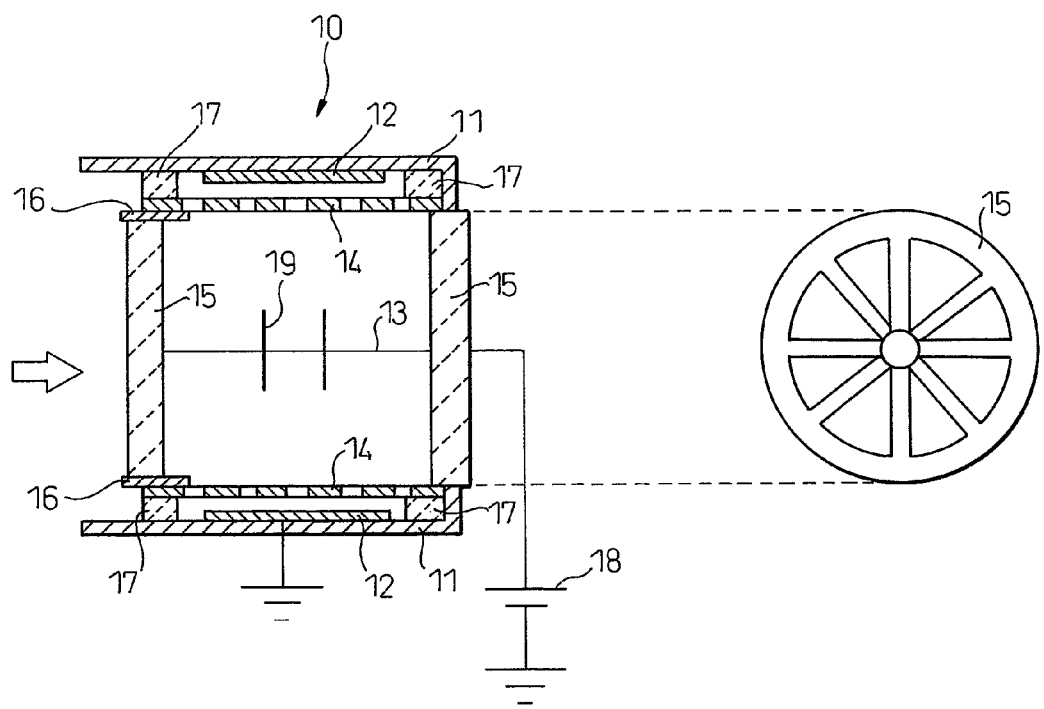
FIG. 1 is a cross-sectional view showing one embodiment of the exhaust gas purifying device of the present invention.

Hereinafter, one embodiment of an exhaust gas purifying device according to the present invention will be explained with reference to the drawings. As shown in FIG. 1, the exhaust gas purifying device 10 comprises an electrically insulated hollow cylindrical case 11, a cylindrical outer circumferential electrode 12 arranged on an inner wall of the hollow cylindrical case, a bar-shaped center electrode 13 held on a center axis of the outer circumferential electrode, and a metallic hollow cylindrical body 14 arranged between the outer circumferential electrode and the center electrode.

The center electrode 13 is held on a center axis of the outer circumferential electrode by a supporting material 15 made of an insulating material such as ceramics, etc. In FIG. 1, the center electrode 13 is connected to a power supply source 18, and the outer circumferential electrode 12 is grounded. On the other hand, the center electrode may be grounded and the outer circumferential electrode may be connected to the power supply source 18.

The metallic hollow cylindrical body 14 is insulatedly fixed between the outer circumferential electrode and the center electrode by an insulation pipe 16 and an insulating fixing jig 17.

Hereinafter, each component constituting the exhaust gas purifying device 10 will be explained in detail.

The hollow cylindrical case 11, which holds the outer circumferential electrode 12 and defines an exhaust gas passage, may be made of any electrically insulating material including, but not limited to, ceramics or the like such as cordierite, alumina, etc. A cross-sectional shape thereof, which is not specifically limited, may be any shape and is preferably circular cylindrical.

The center electrode 13 is made of such a material that electricity can be supplied between the center electrode 13 and the outer circumferential electrode 12. As the material, electrically conductive materials, semiconductive materials, etc., may be used. Among these, metallic materials are preferred. As the metallic materials, specifically, copper, tungsten, stainless steel, iron, aluminum, etc., may be used. Above all, stainless steel is preferred in terms of cost and durability.

As a form of the center electrode, wire is generally used but a hollow electrode can be used. The center electrode 13 is preferably provided with discharge projections 19. The discharge projections 19 are comprised of a plurality of thorny needles so that the ends thereof extend radially from the center electrode 13 towards the outer circumference electrode 12. The optimal number of the needle-like projections, which makes it possible to charge PM in the influent exhaust gas most effectively, can be experimentally determined.

The outer circumferential electrode 12 is formed by arranging the same material as the center electrode 13 in a metallic mesh or metallic foil form on an inner wall of the hollow cylindrical case 11. Alternatively, the outer circumferential electrode 12 is formed by coating an electrically conductive paste onto an inner wall of the hollow cylindrical case 11. The outer circumferential electrode 12 may be of cylindrical shape centered on the center electrode 13, although it is preferably of circular cylindrical shape so that the entire surface is equidistant from the center electrode 13.

The metallic hollow cylindrical body 14 arranged between the outer circumferential electrode 12 and the center electrode 13 is formed in a cylindrical shape using the same material as the outer circumferential electrode or the center electrode, and has a plurality of holes to permit PM in an influent exhaust gas to pass therethrough without being accumulated on the metallic hollow cylindrical body 14 for the purpose of an efficient discharge without an abnormal electrical discharge. As a general size of PM is approximately 2.5 µm, the size of the holes is sufficiently more than 2.5 µm. A general mesh cylindrical body may be used. The shape of the metallic hollow cylindrical body 14 may be of the same cylindrical shape as the outer circumferential electrode 12, although, for efficient discharge, it is preferably of circular cylindrical shape coaxial with the outer circumferential electrode 12 to prevent an abnormal discharge. Regarding the distances between the outer circumference electrode 12, the metallic hollow cylindrical body 14 and the center electrode 13, the distance between the outer circumference electrode 12 and the metallic hollow cylindrical body 14 is set to be shorter than the distance between the metallic hollow cylindrical body 14 and the center electrode 13.

An exhaust gas purifying device 10 comprising the components explained above is enclosed in a case, if necessary, and is connected to an exhaust pipe constituting an exhaust system of, for example, an internal combustion engine. An exhaust gas containing PM flows from the left side to the right side as indicated by the arrow in the drawing. As being electrically charged by the discharge from the center electrode 13, PM is attracted to the outer circumference electrode 12, without being attracted to the insulated metallic hollow cylindrical body 14, to accumulate on the outer circumference electrode 12 through holes of the metallic hollow cylindrical body 14.

In the exhaust gas purifying device 10, the outer circumference electrode 12, the metallic hollow cylindrical body 14, and the center electrode 13 constitute a capacitor in terms of electricity because the metallic hollow cylindrical body 14 is insulated from the outer circumference electrode 12 and the center electrode 13 by an insulation pipe 16 and an insulating fixing jig 17. Electric charge is stored over time in the metallic hollow cylindrical body 14 through the center electrode 13 from the power supply source 18 to generate a discharge towards PM accumulated on the outer circumference electrode 12. As stated above, in the exhaust gas purifying device according to the present invention, since electric charge is once stored in the metallic hollow cylindrical body 14 and thereafter discharged, it is possible to subject PM to an oxidation treatment using a direct current source without the need of generating a pulse discharge required to generate plasma or of a large amount of energy, unlike conventional exhaust gas purifying devices using plasma reactors.

Figure 2:
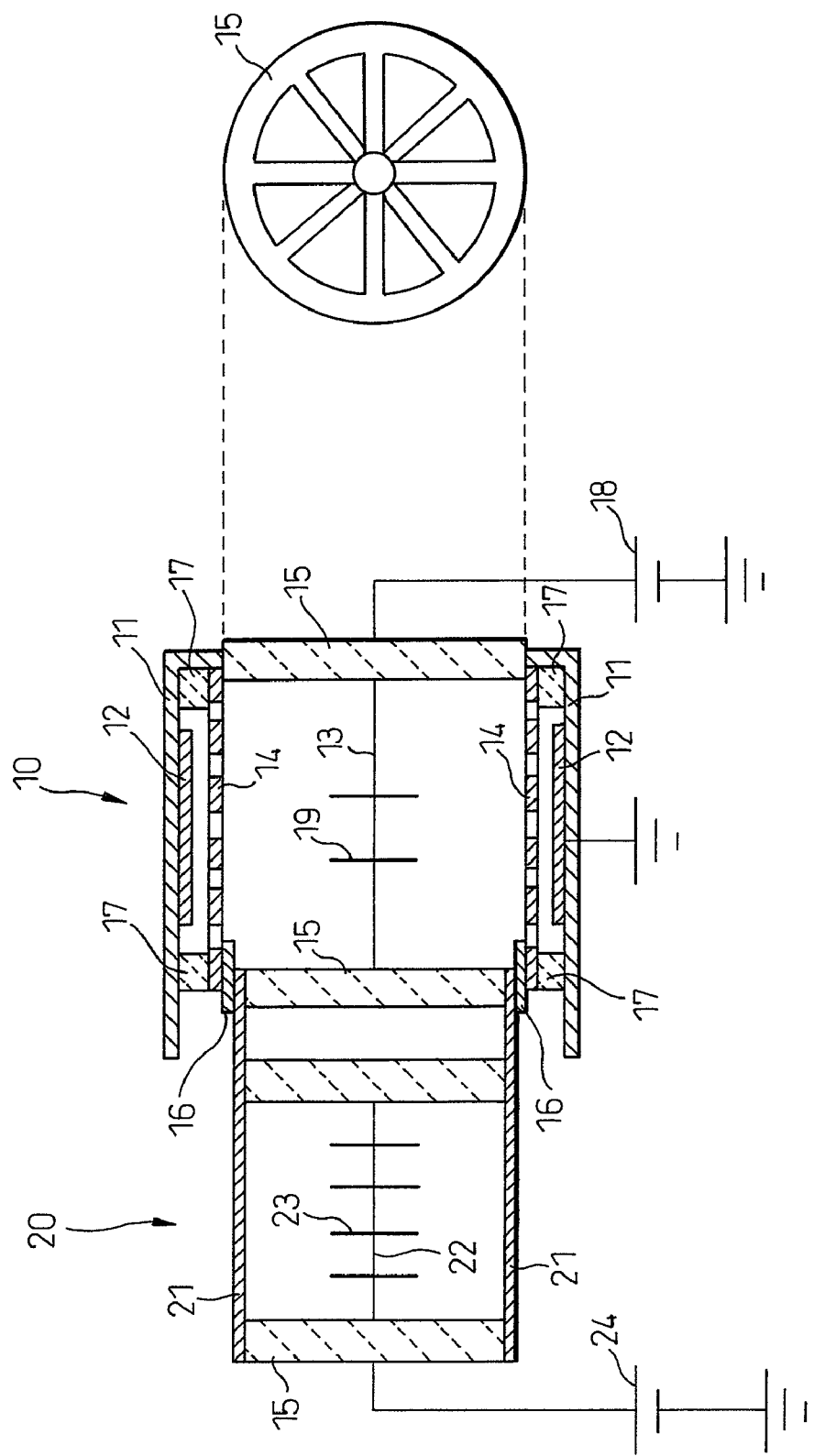
FIG. 2 is a cross-sectional view showing another embodiment of the exhaust gas purifying device of the present invention.
Figure 6:
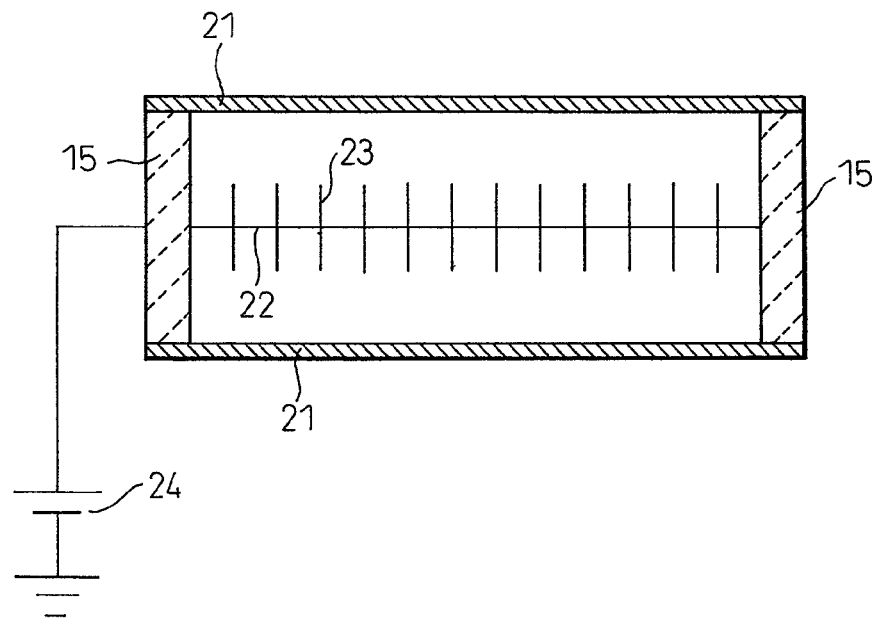
FIG. 6 is a cross-sectional view showing a configuration for a conventional exhaust gas purifying plasma reactor.

In order to enhance the oxidation of PM in the exhaust gas purifying device 10, it is necessary to efficiently introduce PM into the outer circumference electrode 12. Therefore, it is desirable to arrange a PM charging unit on the upstream side of the exhaust gas flow in the exhaust gas purifying device 10. As the unit, for example, a configuration of a conventional exhaust gas purifying plasma reactor shown in FIG. 6 may be employed. One example of the exhaust gas purifying device according to the present invention comprising such a charging unit is shown in FIG. 2. Here, the unit 10 has the same configuration as the exhaust gas purifying device shown in FIG. 1. The charging unit 20 arranged on the upstream side of the exhaust gas flow consists of the cylindrical outer circumference electrode 21 and the bar-shaped center electrode 22 held on a center axis of the outer circumference electrode 21.

The outer circumference electrode 21 and the center electrode 22 can be made of the same material as the outer circumference electrode 12 and the center electrode 13. Further, the center electrode 22 is held on the center axis of the outer circumference 21 by the supporting member 15, and preferably further comprises discharge projections 23.

Figure 3:
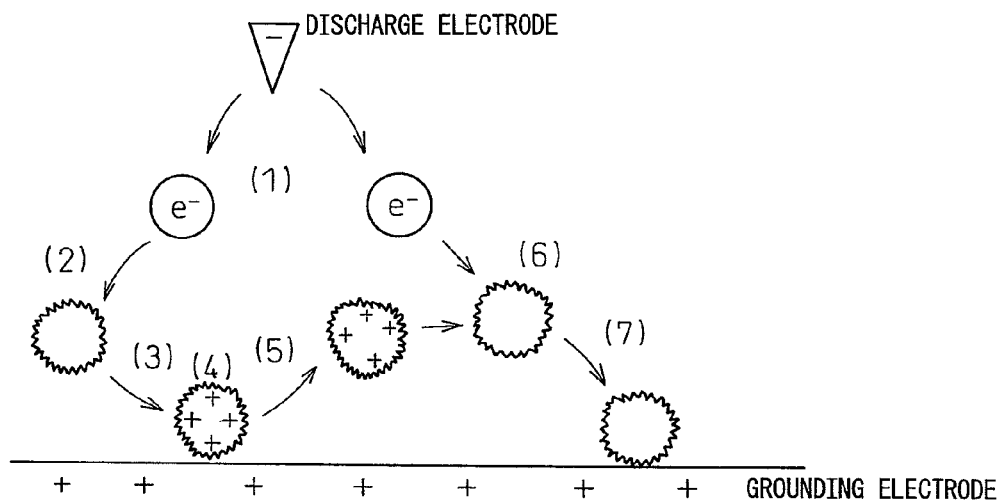
FIG. 3 is a view showing a mechanism of PM coarsening.

When PM flows into a charging unit 20, the PM is charged and becomes coarse with repeated aggregation and dispersal towards the downstream side. The mechanism of the coarsening is explained with reference to FIG. 3.

(1) The discharge electrode (the center electrode in FIG. 2) emits electrons. At this time, a positive charge is introduced into the grounding electrode (the outer circumference electrode).
(2) PM is negatively charged.
(3) PM is adsorbed on the grounding electrode by the force of a electric field.
(4) As PM is electrically conductive, a surface thereof is positively charged by the effect of the positively introduced grounding electrode.
(5) PM repels the grounding electrode and jumps out.
(6) PM is negatively charged again by electron emitted from the discharge electrode.
(7) PM is adsorbed on the grounding electrode.

While repeating the above (1) to (7), PM is scattered around while becoming coarse.

As stated above, because a charging unit is provided, PM which flows therein is strongly charged and becomes coarse, and thereby the PM is easily captured by the unit 10, resulting in the efficient removal by oxidation.

EXAMPLES

PM Capture Rate Measurement Test

Figure 4:
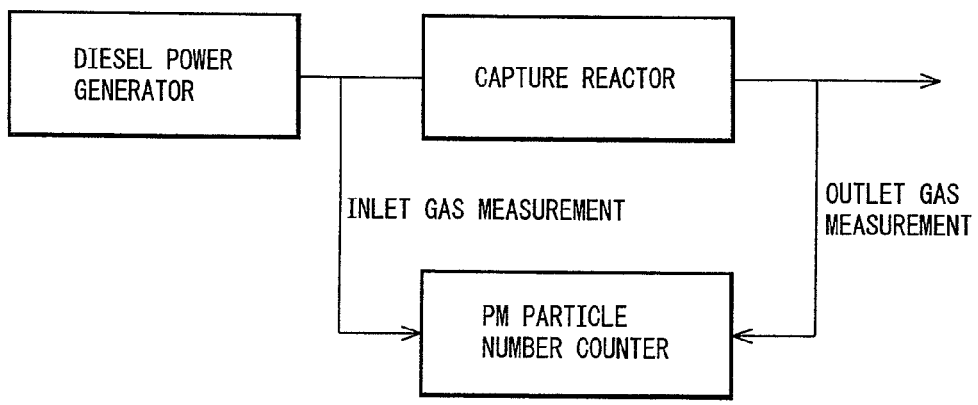
FIG. 4 is a view showing an experimental configuration for PM capture rate measurements.

The PM capture rate was measured using the configuration shown in FIG. 4. Specifically, the operating condition of the diesel generator was at a rated power of 5 kW and at a gas flow rate of 820 mL/min, a digital dust meter was used as a PM particle number counter, and firstly the PM particle number of an inlet gas was measured. Then, the reactor 1 shown in FIG. 6 (This was the same configuration as unit 20 in FIG. 2: the outer circumference electrode diameter: 80 mm, length: 380 mm, the number of discharge projections: 20) was installed as a collection reactor, and, 30 minutes after the installation, the PM particle number of an outlet gas was measured (Comparative example 1). Then, the reactor 1 was removed, and the reactor 2 consisting of unit 10 (the outer circumference electrode diameter: 100 mm, length: 80 mm, the distance between the outer circumference electrode and the metallic hollow cylindrical body: 8 mm) and unit 20 was installed as a collection reactor. Electricity was not supplied by the power supply source 18, but was supplied by the power supply source 24 (−22 kV) alone, and, after 30 minutes, the PM particle number was measured (Comparative example 2). Then, the reactor 2 was removed, and the other reactor 2 consisting of unit 10 and unit 20 was installed, and voltages were applied by both power supply source 18 (−26 kV) and power supply source 24 (−22 kV), and then, after 30 minutes the PM particle number of an outlet gas was measured. The results are shown in Table 1.

TABLE 1

|  | Capture rate % |
| --- | --- |
| Comparative example 1 | 90 |
| Comparative example 2 | 90 |
| Example 1 | 95 |

The reactors in the example and the comparative examples have the same entire length of 380 mm. In the example, the unit 10 was installed to supply electricity from a power supply source, resulting in the increase of the PM capture rate.

PM Oxidation Rate Test

Figure 5:
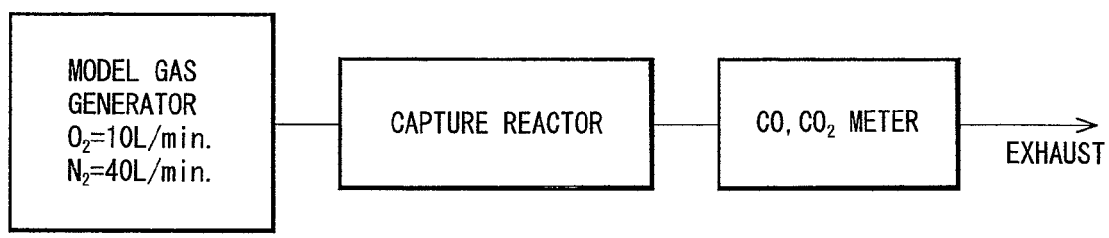
FIG. 5 is a view showing an experimental configuration for PM oxidation rate measurements.

The PM oxidation rate was measured using the configuration shown in FIG. 5. Specifically, a gas was flowed for one hour at a composition of $O_2$ 10 L/min and $N_2$ 40 L/min from a model gas generator through the collection reactor (the reactor temperature was 25° C.) having PM deposited thereon, used to capture PM in the above-mentioned PM capture rate measurement test, and the CO and $CO_2$ generated by the oxidation of PM were measured by a CO and $CO_2$ meter, and consequently, using the integrated values thereof, the PM oxidation rate was calculated. In Comparative example 3, the reactor 1 was supplied with electricity from a direct current source, in Comparative example 4, the reactor 1 was supplied electricity from a pulse source instead of the direct current source, and in Example 2, the reactor 2 was supplied with electricity from the power supply source 18 alone. The results are shown in Table 2. In Example 2, the PM oxidation was possible at a lower energy than in the comparative examples. The above results reveal that, in the exhaust gas purifying device according to the present invention, the PM capture rate is increased, and PM can be removed by the oxidation at a low energy from a direct current source alone.

TABLE 2

|  | PM Oxidation Rate g/h | Input Energy W |
| --- | --- | --- |
| Comparative example 3 | 0 | 20 |
| Comparative example 4 | 0.01 | 100 |
| Example 2 | 0.1 | 20 |

As shown above, according to the present invention, by arranging a metallic hollow cylindrical body electrically isolated between an outer circumference electrode and a center electrode, an electric charge from the center electrode is stored in the metallic hollow cylindrical body, and by discharging the electric charge to the outer circumference electrode, thereby PM can be oxidatively treated without using a pulse source which requires a large amount of energy, resulting in the reduction of necessary energy to a low level.

The invention claimed is:

1. An exhaust gas purifying device comprising an electrically insulated hollow cylindrical case, a cylindrical outer circumferential electrode arranged on an inner wall of the hollow cylindrical case, a bar-shaped center electrode held on a center axis of the outer circumferential electrode, and a metallic hollow cylindrical body arranged between the outer circumferential electrode and the center electrode, wherein the metallic hollow cylindrical body is electrically insulated and has a plurality of holes to permit particulate matter to pass therethrough without being accumulated.

2. An exhaust gas purifying device according to claim 1, wherein the center electrode is connected to a direct current source and the outer circumferential electrode is grounded.

3. An exhaust gas purifying device according to claim 1, wherein the center electrode is grounded and the outer circumferential electrode is connected to a direct current source.

4. An exhaust gas purifying device according to claim 1, wherein the center electrode has a plurality of discharge projections whose ends extend radially towards the outer circumference electrode.

5. An exhaust gas purifying device according to claim 1, further comprising a particulate charging unit provided on the upstream side of an exhaust gas flow.

6. An exhaust gas purifying device according to claim 5, wherein the particulate charging unit comprises a cylindrical outer circumferential electrode and a bar-shaped center electrode held on a center axis of the outer circumferential electrode.

7. An exhaust gas purifying device according to claim 2, wherein the center electrode has a plurality of discharge projections whose ends extend radially towards the outer circumference electrode.

8. An exhaust gas purifying device according to claim 3, wherein the center electrode has a plurality of discharge projections whose ends extend radially towards the outer circumference electrode.

* * * * *